United States Patent
Weiβ et al.

(10) Patent No.: US 9,139,686 B2
(45) Date of Patent: Sep. 22, 2015

(54) POLYURETHANE BLOCK COPOLYMER BASED ON POLY SILOXANE TENSIDE FOR MEMBRANES

(75) Inventors: Thomas Weiβ, Ilvesheim (DE); Jaleh Mansouri, Rosebery (AU)

(73) Assignee: POLYMERS CRC LTD., Notting Hill (AU)

( * ) Notice: Subject to any disclaimer, the term of this patent is extended or adjusted under 35 U.S.C. 154(b) by 106 days.

(21) Appl. No.: 13/582,469

(22) PCT Filed: Mar. 1, 2011

(86) PCT No.: PCT/EP2011/052956
§ 371 (c)(1),
(2), (4) Date: Sep. 20, 2012

(87) PCT Pub. No.: WO2011/110441
PCT Pub. Date: Sep. 15, 2011

(65) Prior Publication Data
US 2013/0004454 A1    Jan. 3, 2013

(30) Foreign Application Priority Data

Mar. 9, 2010 (EP) .................................. 10155922
Jun. 18, 2010 (EP) .................................. 10166455

(51) Int. Cl.
| | | |
|---|---|---|
| B01D 71/68 | (2006.01) | |
| B01D 71/54 | (2006.01) | |
| B01D 71/70 | (2006.01) | |
| B01D 71/16 | (2006.01) | |
| B01D 71/58 | (2006.01) | |
| B01D 71/50 | (2006.01) | |
| B01D 71/34 | (2006.01) | |
| B01D 71/26 | (2006.01) | |
| B01D 71/06 | (2006.01) | |
| B01D 71/28 | (2006.01) | |
| A01N 59/16 | (2006.01) | |
| A01N 55/10 | (2006.01) | |
| A01P 1/00 | (2006.01) | |
| C08G 18/73 | (2006.01) | |
| B01D 53/22 | (2006.01) | |
| B01D 61/14 | (2006.01) | |
| B01D 69/02 | (2006.01) | |
| B01D 71/80 | (2006.01) | |
| C08G 18/40 | (2006.01) | |
| C08G 18/48 | (2006.01) | |
| C08G 18/50 | (2006.01) | |
| C08G 18/61 | (2006.01) | |
| C08G 18/64 | (2006.01) | |
| C08L 75/04 | (2006.01) | |

(Continued)

(52) U.S. Cl.
CPC .............. *C08G 18/73* (2013.01); *B01D 53/228* (2013.01); *B01D 61/145* (2013.01); *B01D 69/02* (2013.01); *B01D 71/54* (2013.01); *B01D 71/68* (2013.01); *B01D 71/70* (2013.01); *B01D 71/80* (2013.01); *C08G 18/4081* (2013.01); *C08G 18/4833* (2013.01); *C08G 18/5096* (2013.01); *C08G 18/61* (2013.01); *C08G 18/6453* (2013.01); *C08G 77/458* (2013.01); *C08L 75/04* (2013.01); *C08L 83/10* (2013.01); *B01D 2325/48* (2013.01); *C08G 2340/00* (2013.01); *C08L 39/06* (2013.01); *C08L 81/06* (2013.01)

(58) Field of Classification Search
USPC ........ 424/78.09; 210/500.28, 500.41, 500.27, 210/500.3, 500.34, 500, 38, 4, 500.43, 42, 210/500.36; 525/452, 453
See application file for complete search history.

(56) References Cited

U.S. PATENT DOCUMENTS

| | | | | |
|---|---|---|---|---|
| 4,939,007 A | * | 7/1990 | Hu et al. ..................... | 428/34.1 |
| 5,019,096 A | * | 5/1991 | Fox et al. ..................... | 600/36 |

(Continued)

FOREIGN PATENT DOCUMENTS

| | | |
|---|---|---|
| CN | 1287498 A | 3/2001 |
| CN | 1777451 A | 5/2006 |

(Continued)

OTHER PUBLICATIONS

Khayet et al. (Desalination 148 (2002) 31-37).*

(Continued)

*Primary Examiner* — Anna Falkowitz
(74) *Attorney, Agent, or Firm* — Oblon, McClelland, Maier & Neustadt, L.L.P.

(57) ABSTRACT

Oligo- or polyurethane compounds of the formula (I) wherein k and n independently are numbers from 1 to 100, m is from the range 1-100, (X) is a block of formula (II) and (Y) is a block of the formula (III), (A) is a residue of an aliphatic or aromatic diisocyanate linker, (B) is a residue of a linear oligo- or polysiloxane containing alkanol end groups, and optionally further containing one or more aliphatic ether moieties, and (C) is an aromatic oligo- or polysulfone block, may advantageously be used as anti-adhesion additives in polymer compositions e.g. for membranes; related oligo- or polyurethanes wherein m is 0 are especially suitable for the preparation of antimicrobial water separation membranes.

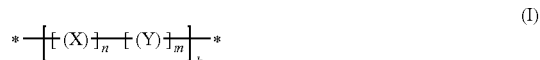

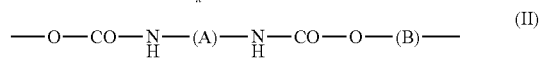

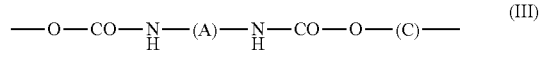

17 Claims, No Drawings

(51) Int. Cl.
*C08G 77/458* (2006.01)
*C08L 83/10* (2006.01)
*C08L 39/06* (2006.01)
*C08L 81/06* (2006.01)

(56) References Cited

U.S. PATENT DOCUMENTS

| | | | |
|---|---|---|---|
| 5,102,547 | A | 4/1992 | Waite et al. |
| 6,652,751 | B1 | 11/2003 | Kutowy |
| 2004/0087752 | A1 | 5/2004 | Schindler et al. |
| 2011/0189469 | A1 | 8/2011 | Stenzel |

FOREIGN PATENT DOCUMENTS

| | | |
|---|---|---|
| EP | 0 332 065 A2 | 9/1989 |
| JP | 57-156004 | 9/1982 |
| JP | 57-156005 | 9/1982 |
| JP | 03-047131 A | 2/1991 |
| WO | WO 00/21585 A1 | 4/2000 |
| WO | WO 2004/103425 A1 | 12/2004 |
| WO | 2007/053163 | 5/2007 |
| WO | 2009/098161 A1 | 8/2009 |

OTHER PUBLICATIONS

S. Krishnan et al., J. Mater. Chem. vol. 18, pp. 3405 (2008).
Copending U.S. Appl. No. 13/582,469, filed Sep. 4, 2012.
AN 1982-93974E of JP 57156004 Mar. 20, 1981.
Combined Chinese Office Action and Search Report issued Dec. 9, 2013 in Patent Application No. 201180012706.4 (with English translation of categories of cited documents).
"Binders aids", Chemical Industry Press, 1$^{st}$ edition, Feb. 28, 2005, 5 Pages with cover pages and English abstract.
Ho Bum Park, et al., "Gas separation properties of polysiloxane/polyether mixed soft segment urethane urea membranes", Journal of Membrane Science, vol. 204, 2002, pp. 257-269 with English abstract.

* cited by examiner

POLYURETHANE BLOCK COPOLYMER BASED ON POLY SILOXANE TENSIDE FOR MEMBRANES

The instant invention relates to novel polyurethane block copolymers based on poly siloxane(tensides) with anchoring units, their use as anti bio-adhesion additives especially in membrane preparation, and polymer membranes, especially for microfiltration, ultrafiltration or gas separation or purification purposes, containing the novel copolymers.

The problem of biofouling is pronounced in semipermeable membranes used for separation purposes like microfiltration, ultrafiltration or reverse osmosis. Membranes may be classified according to their pore dimension in most of the application profiles. For example, in water filtration applications ultra filtration membranes (approximate pore diameter: 100-1000 nm) are used for wastewater treatment retaining organic and bioorganic material. Much smaller diameters are required in desalination applications (reverse osmosis; approximate pore diameter 1 nm) for retaining ions. In these applications, the ambient medium is an aqueous phase, where potential blockage may occur by adhesion of micro-organisms and bio-film formation. In consequence, a membrane with anti-adhesion properties is desired, which would reduce bio-film formation and thus require less cleaning cycles.

U.S. Pat. No. 5,102,547 proposes various methods for the incorporation of oligodynamic materials including silver powders and silver colloids into membranes. U.S. Pat. No. 6,652,751 compares several bacteriostatic membranes obtained after contacting polymer solutions containing a metal salt with a coagulation bath containing a reducing agent. Membranes containing certain modified polymers have also been proposed to improve fouling resistance; WO 09/098,161 discloses certain alkoxyamine-functionalized polysulfones as additives for the purpose. WO 07/053,163 recommends incorporation of certain graft-copolymers based on a polysiloxane backbone into polymeric materials such as coatings to impart antifouling properties. Hydrophobic properties of polysiloxanes have already been exploited to impart "fouling release" properties to surfaces coated by these polymers or by certain copolymers containing polysiloxane blocks (see S. Krishnan, J. Mater. Chem. 2008, 18, 3405, and references cited therein).

Certain block-copolymers with urethane linkage have now been found, which show especially advantageous antifouling properties. Due to their good compatibility, the present block-copolymers may be fully incorporated into other matrix polymers, or rigidly anchored in these matrices and enriched at the surface. Thus, the present block-copolymers may conveniently be used as an additive imparting antimicrobial and anti bioadhesion properties to polymeric articles and their surfaces, e.g. when incorporated into a membrane, especially a membrane for water filtration purposes. The present block-copolymers contain one or more polysiloxane blocks as diol component (B), whose alkanol end groups are optionally extended by one or more ether moieties. Further conveniently contained are aromatic polysulfone blocks (C) as second diol component. Linkage between the diol blocks is effected by urethane linkers (A) derived from aromatic or aliphatic diisocyanates.

In a first general aspect, present invention thus pertains to oligo- and polyurethane molecules comprising said components (A), (B) and (C) of the formula

wherein k and n independently are numbers from 1 to 100, m is from the range 1-50,
where
(X) is a block of formula

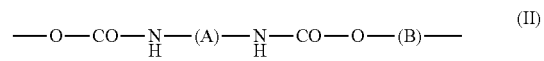

and (Y) is a block of the formula

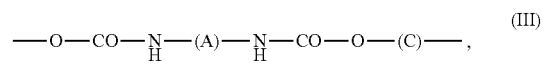

(A) is a residue of an aliphatic or aromatic diisocyanate linker,
(B) is a residue of a linear oligo- or polysiloxane containing alkanol end groups, and optionally further containing one or more aliphatic ether moieties, and
(C) is an aromatic oligo- or polysulfone block.

The blocks (X) and (Y) in formula I may be in statistical order or, again, in blocks; the usual procedure (see present examples) yields blocks (X) and (Y) in statistical order. The moieties (A), (B) and (C) may also comprise minor amounts of tri- or polyvalent residues, e.g. by including a minor quantity of a triisocyanate and/or tetraisocyanate into the preparation of the present oligo- or polyurethane. The resulting branched species share the advantageous properties of the present linear oligo- and polyurethanes, and are included by the present invention.

Preferred oligo- and polyurethane molecules of the invention contain at least one block (X) and at least one block (Y); preferred n and m ranging from 2 to 50, and preferred k ranging from 1 to 20. The molecular weight (Mn) is preferably from the range 1500 to 100000, more preferably from the range 4000 to 25000. Most preferred compounds show a polydispersity ranging from 1.5 to 3.0.

Preferred (A) is a divalent residue selected from $C_2$-$C_{12}$alkylene and Ar.

Preferred (B) is a divalent residue of an oligo- or polysiloxane of the formula

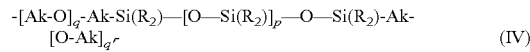

wherein Ak stands for $C_2$-$C_4$alkylene, R stands for $C_1$-$C_4$alkyl, and each of p, q and q' independently is a number selected from the range 0-50. In more preferred moieties (B) of formula (IV), p ranges from 1 to 50, especially from 2 to 50.

Preferred (C) is a diphenyl sulfone monomer or linear oligomer or polymer block containing 1-50 moieties phenyl-$SO_2$-phenyl, and optionally further 1-50 further moieties Ar, which moieties are, in case of the oligomer or polymer, linked together by means selected from direct bonds and spacers Sp; Ar is selected from -Ph-Ph- and -Ph-Sp-Ph-;
Ph is phenyl or phenyl substituted by $C_1$-$C_4$alkyl;
where the spacers Sp independently are —O— or $C_1$-$C_3$alkylene.

End groups in the oligomer or polymer (marked by asterisks * in formula I) mainly are mono-reacted constituents of the polyurethane (e.g. free OH from the diol component, or mono-reacted diisocyanate [—CO—NH-A-NCO], attached to (B) or (C) on the right side of formula I; or mono-reacted diol component HO—(B)— or HO—(C) attached on the left side of formula I). Chain termination may also be effected by including a certain amount (e.g. up to 20 mol-%) of monofunctional constituents, e.g. monoalcohols R'—(B)—OH or R'—(C)—OH where R' is alkyl (such as $C_1$-$C_4$alkyl), Ar or especially H; R' (appropriately attached to (B) or (C)) thus forming one or both end group(s). In accordance, the present oligo- and polyurethanes are essentially free of typical silane end groups like $Si(R'')_3$, where R'' is any of H, alkyl, alkoxy.

The invention further pertains to a membrane, especially semipermeable membrane, comprising the above polymer composition. The membrane of the invention generally shows an at least 8-fold enrichment of silicon, especially an 8- to 25-fold enrichment of silicon, in the section 2-10 nm from the membrane surface over the membrane's average silicon content. The invention includes the use of this membrane as a filter membrane in a water treatment, water separation or gas separation process.

Further, it has been found that, surprisingly, polysulfone moieties are not necessarily required in copolymers used as additives in water filtration membranes, thus still providing a good enrichment of silicone on the membrane surface, and good membrane operating properties such as antiadhesion and flux recovery effect in the aqueous environment. The invention thus further pertains to, in a second aspect, to a water filtration membrane comprising an oligo- and polyurethane comprising above said components (A) and (B), but not (C) or any other sulfone moiety, of the formula —$(X)_n$— wherein n ranges from 2 to 100, especially from 2 to 50, where (X) is a block of formula

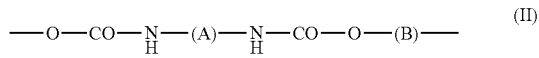

(II)

(A) is a residue of an aliphatic or aromatic diisocyanate linker, (B) is a residue of a linear oligo- or polysiloxane, especially containing 3 or more Si atoms, and containing alkanol end groups, and optionally further containing one or more aliphatic ether moieties.

Further constituents of the membrane generally comprise (as component b) one or more further organic polymers selected from the group consisting of polyvinyl pyrolidone, polyvinyl acetates, cellulose acetates, polyacrylonitriles, polyamides, polyolefines, polyesters, polysulfones, polyethersulfones, polycarbonates, polyether ketones, sulfonated polyether ketones, polyamide sulfones, polyvinylidene fluorides, polyvinylchlorides, polystyrenes and polytetrafluoroethylenes, copolymers thereof, and mixtures thereof; preferably selected from the group consisting of polysulfones, polyethersulfones, polyvinylidene fluorides, polyamides, cellulose acetate and mixtures thereof.

End groups in the sulfone-free oligo- or polyurethane mainly are mono-reacted constituents of the polyurethane (e.g. free OH from the diol component, or mono-reacted diisocyanate [—CO—NH-A-NCO]. In accordance, the present oligo- and polyurethanes are essentially free of typical silane end groups like $Si(R'')_3$, where R'' is any of H, alkyl, alkoxy.

Preferred meanings for (A) and (B) are as defined for copolymers of formula I above; specifically, the molecular weight (Mn) of the polyurethane is preferably from the range 1500 to 100000;

(A) preferably is a divalent residue selected from $C_2$-$C_{12}$alkylene and Ar;
(B) preferably is a divalent residue of an oligo- or polysiloxane of the formula

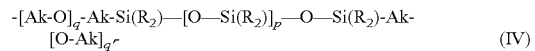

(IV)

wherein Ak stands for $C_2$-$C_4$alkylene, R stands for $C_1$-$C_4$alkyl, and each of q and q' independently is a number selected from the range 0-50, and p ranges from 1 to 50, especially from 2 to 50;
Ar is -Ph-Sp-Ph-;
Ph is phenyl or phenyl substituted by $C_1$-$C_4$alkyl; and
Sp independently is selected from direct bond, —O—, $C_1$-$C_3$alkylene.

The water filtration membrane (semipermeable membrane) preferably consists essentially of a polymer composition comprising above said oligo- or polyurethane in an amount of 0.1 to 25% by weight of the total polymer composition, especially in a homogenous phase or within the same phase enriched at the surface. It may further comprise one or more antimicrobial or bacteriostatic agents, especially silver in ionic and/or metallic form such as silver colloid, silver glass, silver zeolite, silver salts, elemental silver in form of powder, microparticle, nanoparticle or cluster, and often shows an at least 8-fold enrichment of silicon, especially an 8- to 25-fold enrichment of silicon, in the section 2-10 nm from the membrane surface over the membrane's average silicon content.

The process for preparing the semipermeable water treatment membrane of the invention generally comprises incorporation of the above oligo- or polyurethane, a further polymer as noted under component (b), and optionally further additives into the membrane material.

The following samples represent examples with mean analytical data for a variety of polyurethanes for use especially in water filtration membranes according to the invention (see examples below for abbreviations/identification of blocks or monomer components; ratios given are by mol):

Poly(polydimethylsiloxane-block-co-polyethylenoxid) urethane a polyurethane containing IM22 and HDI as linker characterized by:
Gel permeation chromatography for molecular mass (kDa): Mn 13±5; Mw 31±15; Mp 22±7; PD 2.4±0.5
1H-NMR spectroscopy: (SiMe2O)/(C2H4O): 0.71
Elementary analysis [%]: C, 44.7; H, 8.7; Si: 15.7

Poly(polydimethylsiloxane-block-co-polyether)urethane a polyurethane containing IM15-PEG 2000 (1:1) and HDI as linker characterized by:
Gel permeation chromatography for molecular mass (kDa): Mn 15±7; Mw 30±16; Mp 22±10; PD 2.0±0.6
1H-NMR spectroscopy: (SiMe2O)/(C2H4O): 0.27-1.07
Elementary analysis [%]: C, 40.06-47.2; H, 8.1-8.5; Si: 10.5-22.0

Poly(polydimethylsiloxane-block-co-polyethersulfonyl) urethane a polyurethane containing PSU1-IM15 (2:1) and HDI as linker characterized by:
Gel permeation chromatography for molecular mass (kDa): Mn 8±2; Mw 18±3; Mp 16±2; PD 2.2±0.3
1H-NMR spectroscopy: (SiMe2O)/(CMe2): 0.58
Elementary analysis [%]: C, 56.8; H, 6.3; Si: 10.0

Poly(polydimethylsiloxane-block-co-polyethylenoxid-block-co-polyethersulfonyl)urethane containing PSU1-IM22 (2:1) and HDI as linker characterized by:
Gel permeation chromatography for molecular mass (kDa): Mn 5±2; Mw 14±4; Mp 14±5; PD 2.7±0.2
1H-NMR spectroscopy: (SiMe2O)/(CMe2): 1.45

Elementary analysis [%]: C, 62.6; H, 6.2; Si: 10.6

Poly(polydimethylsiloxane-block-co-polyethylenoxid-block-polydimethylsiloxane)-urethane containing IM15-IM22 (1:1) and HDI as linker characterized by:

Gel permeation chromatography for molecular mass (kDa): Mn 18±3; Mw 36±17; Mp 31±11; PD 1.9±0.6

1H-NMR spectroscopy: (SiMe2O)/(C2H4O): 0.91

Elementary analysis [%]: C, 40.2; H, 8.5; Si: 24.6

Poly(polydimethylsiloxane-block-co-polyethylenoxid-block-polydimethylsiloxane)-urethane or containing IM11-IM22 (2:1) and HDI as linker characterized by:

Gel permeation chromatography for molecular mass (kDa): Mn 15±5; Mw 34±7; Mp 28±17; PD 2.3±0.4

The poly urethane reaction for the preparation of the present copolymers is analogous to the one commonly used to build up a broad variety of polymers such as soft and hard polyurethanes in multiple applications and use. Typically, the reaction is carried out in presence of aprotic none or less polar solvents and with the use of catalysts such as amines (imidazoles), tin organic compounds and others. Typical diols used are polyethlenglycols with varying molecular weight, polyesterols or OH-terminated oligomers or even polymers. Thus, a great variety of copolymers are accessible regarding the use of technically available diisocyanates such as aliphatic diisocyanates (especially hexamethylenediisocyanate HDI), isophorone diisocyanate, aromatic methylendiphenyldiisocyanate (MDI) or 2,4-toluenediisocyanate (TDI). The variety of products is much more expandable, if mixtures of different diols are taken into account, resulting in fine-tuned polymeric structures with statistic linked diol blocks sequences. Therefore, the present urethane linked XnYm block copolymers are producible in a rational way with high variability to reach application requirements. As subject of the present invention, OH-terminated siliconbased surfactants are useful as diol components in combination with diisocyanates.

Typical monomers for the preparation of the present polyurethanes are:

A) Diisocyanates

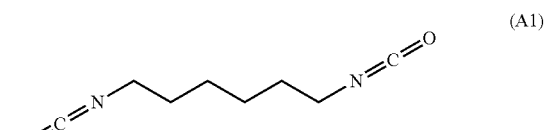
(A1)

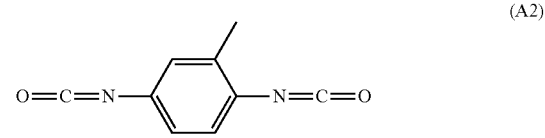
(A2)

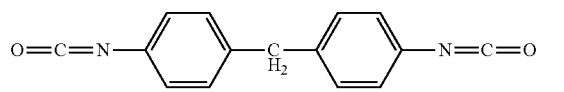
(A3)

B) Dioles

(B1)

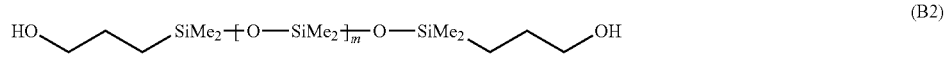
(B2)

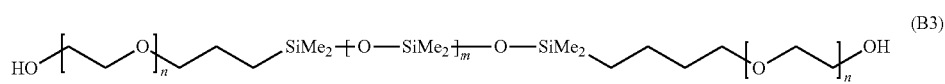
(B3)

C) Dioles

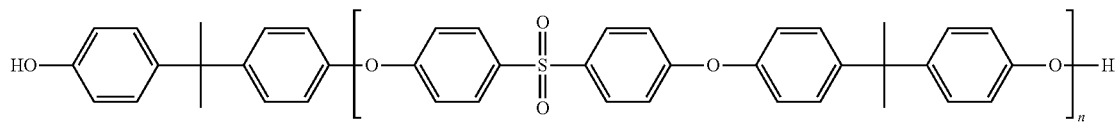
(C1)

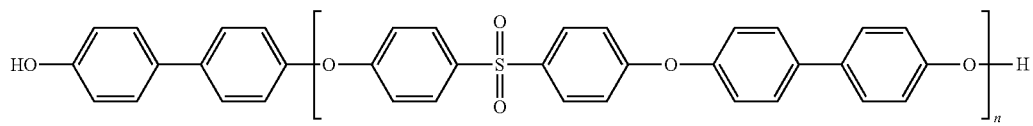
(C2)

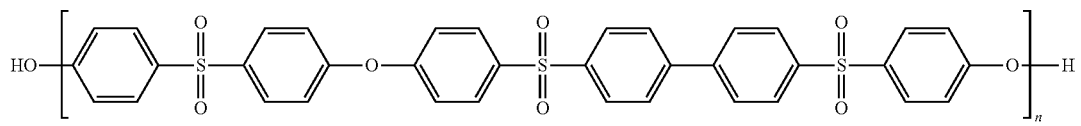
(C3)

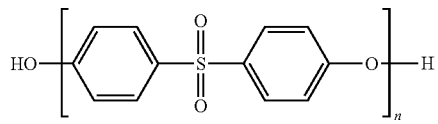

(C4)

with n, m each ranging from 1 to 100.

Polymer Compositions, Membrane Manufacturing and Processing

The present copolymers are preferably used as anti-adhesion additives in polymer compositions, such as compositions for membranes, especially water processing or gas separation membranes.

Manufacturing of ultra filtration membranes often includes solvent induced phase separation (SIPS). The present copolymers are preferably employed as additives in this process.

In the SIPS process, the educt polymers (e.g. selected from polyvinyl pyrolidone, vinyl acetates, cellulose acetates, polyacrylonitriles, polyamides, polyolefines, polyesters, polysulfones, polyethersulfones, polycarbonates, polyether ketones, sulfonated polyether ketones, polyamide sulfones, polyvinylidene fluorides, polyvinylchlorides, polystyrenes and polytetrafluorethylenes, copolymers thereof, and mixtures thereof; preferably selected from the group consisting of polysulfones, polyethersulfones, polyvinylidene fluorides, polyamides, cellulose acetate and mixtures thereof, especially including poly ether sulfone) are dissolved in a suitable solvent (e.g. N-methylpyrrolidone, dimethyllacetamide or dimethylsulfoxide) together with the additive(s). In a next step, a porous polymeric membrane is formed under controlled conditions in a coagulation bath. In most cases, the coagulation bath contains water as coagulant, or the coagulation bath is an aqueous medium, wherein the matrix forming polymer is not soluble. The cloud point of the polymer is defined in the ideal ternary phase diagram. In a bimodal phase separation, a microscopic porous architecture is then obtained, and water soluble components (including polymeric additives) are finally found in the aqueous phase.

In case that the polymeric additive is simultaneously compatible with the coagulant and the matrix polymer(s), segregation on the surface results. With the surface segregation, an enrichment of the additive is observed. The membrane surface thus offers new (hydrophilic) properties compared to the primarily matrix-forming polymer, the phase separation induced enrichment of the additive of the invention leading to antiadhesive surface structures.

An important property of the novel surface modifying additive is the formation of a dense coverage combined with a strong anchoring effect to the polymeric matrix. In many cases, a surface structure is obtained by micro-structured self-assembling monolayers (SAM), which hinder the adhesion of microbes.

The present copolymers combine structural elements, which encourage detachment of fouling. These copolymers are especially useful as a blending additive, since they contain an antifouling segment and an anchor, the combination of which is especially useful for membrane applications; the silicone moiety further is a good "sticking polymer" to polysulfone, thus providing structural stability and contributing to the low leaching properties.

The present copolymers combine low energy segments and hydrophilic segments. Phenomenologically, these segments reassemble to form nano-scaled structures in the topography of the membranes surface. In case of simultaneous self assembling of the copolymers during the SIPS process, the membrane surfaces are covered by substructures leading to reduced fouling properties of the membrane either by added topographic (relief and/or area dimension) or surface energy structuring moieties (by electrostatic interaction with the ambient media).

Antifouling properties of the present polymer compositions, especially of the membranes, may be enhanced by further incorporation of one or more antimicrobial or bacteriostatic agents into the composition. A preferred agent is an oligodynamic metal, especially silver in ionic and/or metallic form. Optionally, the silver component may be accompanied by zinc oxide as co-component. Useful silver components include silver colloids, silver glass, silver zeolites, silver salts, elemental silver in form of powder or microparticles or nanoparticles or clusters. An advantageous method of preparing an antimicrobial membrane includes in situ formation of elemental silver particles in the casting solution containing one or more (co)polymers of the present polymer composition in dissolved form. Elemental silver particles, especially those incorporated into semipermeable membranes and/or polymer matrices close to the final article's surface, may be transformed into silver halogenide particles such as AgCl, AgBr, AgI, e.g. by treatment with a hypohalogenide solution (e.g. of NaOCl).

A typical process for the preparation of a solution to prepare membranes is characterized by the following steps:

1. Solving matrix polymers for a membrane's dope in a suitable solvent, typically NMP, DMA, DMSO or mixtures of them.

2. Adding pore forming additives such as PVP, PEG, sulfonated PES or mixtures of them 3. Heating the mixtures until a viscous solution is obtained; typically temperatures at 5-250° C., preferred 25-150° C., mostly preferred 60-90° C.

4. Adding the anti-adhesion silicone-polyurethane additive to the dope at 5-250° C., preferred 25-150° C., and mostly preferred 60-90° C. Optionally other additives e.g. silver containing compounds may be added in the same step.

5. Stirring of the solution/suspension until a mixture is formed within 1-15 h, typically the homogenization is finalized within 2 h.

6. Casting the membrane dope in a coagulation bath to obtain a membrane structure. Optionally the casting could be outlined using a polymeric support (non-woven) for stabilizing the membrane structure mechanically. To test the bioactivity for the application a standard procedure in flat membrane fabrication is used.

7. Analysis of the membrane for additive content.

The following examples illustrate the invention. Unless otherwise stated, room temperature denotes an ambient temperature of 20-25° C.; molecular weight data (such as Mw, Mn) are as determined by gel permeation chromatography; and water contact angle (WCA) measurements are performed according to the static sessile drop method.

Abbreviations used in the examples and elsewhere:
L liter
NMP N-methylpyrolidone
PD Polydispersity
PEG Polyethyleneglycol
PES Poylethersulfone
PVP Polyvinylpyrolidone
thf Tetrahydrofurane
w %, wt % percent by weight

COMPONENTS USED IN THE EXAMPLES

A) Diisocyanates
HDI: 1,6-Hexamethylene diisocyanate (Desmodur H®, commercial product from Bayer, Germany)
TDI: 2,4-Toluenediisocyanate (commercial product from Aldrich, Germany)
MDI: Diphenylmethane-4,4'-diisocyanate (Desmodur 44 MC®, commercial product from Bayer, Germany)

B) Diol 1

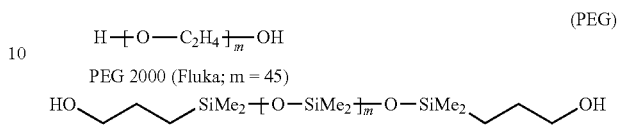

PEG 2000 (Fluka; m = 45)

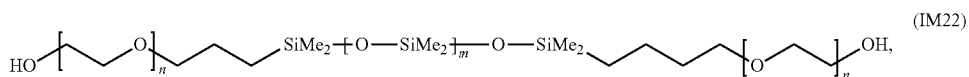

Poly dimethylsiloxane;
m=10 available as IM 11® (IM11)
m=50 available as IM 15® (IM15)
each from Wacker, Germany.

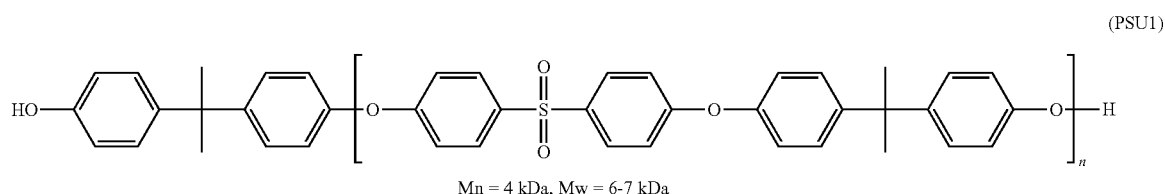

Poly dimethylsiloxane-b-polyethylenoxide: IM 22®, available from Wacker, Germany.

C) Diol 2

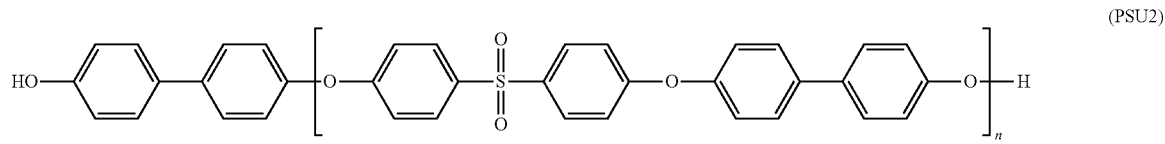

Mn = 4 kDa, Mw = 6-7 kDa

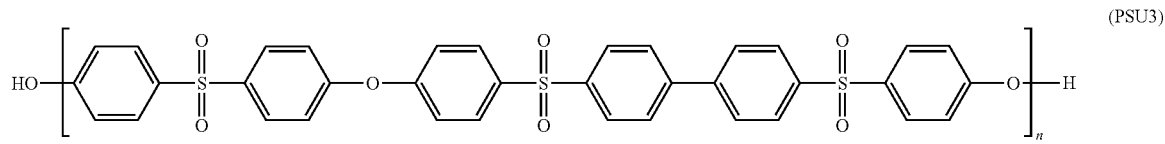

Ultrason® 2020 PSR (commercial product from BASF, Germany) (PSU5)

D) Further Polymers and Solvents:

Tetrahydrofurane: commercial product from Aldrich, Germany.

N-methylpyrolidone (NMP): commercial product from Aldrich, Germany.

Polyvinylpyrolidone (PVP): Luvitec® PVP 40 K commercial product from BASF, Germany.

Example 1

Preparation of the Siloxane-Block-Polyurethane

Instruments 250 ml Erlenmeyer glass tube, magnetic stirrer, heat plate, condenser, internal thermometer Diol components are mixed in 120 ml of tetrahydrofurane (thf) at 25° C. According to the sum of the OH-numbers of the diol components, the diisocyanate component is added in one dosage. Solid diisocyanate components are added as a solution in 30 ml of thf. After stirring the mixture for 5 minutes, the catalysts (1,8-diazabicyclo[5.4.0]-undec-7-ene (DBU): 0.1 g; and dibutyl tin dilaurate: 0.1 g) are added. The well observable NCO-absorption vibration at 2325 $cm^{-1}$ is used for monitoring the progress of the reaction. The reaction mixture is stirred for 15 h at 25° C.; subsequently, all volatile components are evaporated using a rotary evaporator and high vacuum pump. The crude polymeric compounds are characterized by elemental analysis, 1H-NMR and gel-permeation chromatography. The following table 1 shows the amounts of reactants used and the characterization of the polymers obtained.

TABLE 1

Composition of copolymers (amounts [g] refer to component in column left)

| Sample | Diol 1 | [g] | Diol 2 | [g] | Diisoc. | [g] | NCO/OH |
|---|---|---|---|---|---|---|---|
| A1.0 | IM15 | 7.5 | IM22 | 7.5 | HDI | 0.99 | 1.0 |
| A1.1 | IM15 | 7.5 | IM22 | 7.5 | HDI | 0.99 | 1.0 |
| A2.0 | PSU1 | 10 | IM22 | 5 | HDI | 0.98 | 1.0 |
| A2.1 | PSU1 | 10 | IM22 | 5 | HDI | 0.98 | 1.0 |
| A3.0 | PSU1 | 10 | IM15 | 5 | HDI | 0.61 | 1.0 |
| A4.0 | PSU1 | 10 | IM22 | 5 | MDI | 0.61 | 1.0 |
| A5.0 | PSU1 | 10 | IM22 | 5 | TDI | 0.61 | 1.0 |
| A6.0 | PSU5 | 10 | IM22 | 5 | MDI | 0.80 | 1.0 |
| A7.0 | IM11 | 15 | IM22 | 30 | HDI | 7.39 | 1.2 |
| A8.0 | IM22 | 15 | — | — | HDI | 2.03 | 1.5 |
| A9.0 | IM22 | 15 | — | — | MDI | 2.01 | 1.0 |

Characterizations of the Polyurethane Block Copolymers:

Gel permeation chromatography (GPC) in tetrahydrofurane and polystyrene as reference; elementary analysis (EA) and 1H-NMR spectroscopy in d6-dimethylsulfoxide as solvent. Results are shown in table 2.

TABLE 2

Copolymer characteristics

| Sample No. | GPC (Da) | | | | Elemental Analysis | | | 1H-NMR ($d_6$-DMSO) | | |
|---|---|---|---|---|---|---|---|---|---|---|
| | Mn | Mw | Mp | PD | % C | % H | % Si | $\frac{CH_3Si}{CH_3C}$ | $\frac{C_2H_4O}{(CH_3)_2C}$ | $\frac{(CH_3)_2Si}{C_2H_4O}$ |
| A1.0 | 14885 | 19755 | 23382 | 1.32 | | | | | | |
| A1.1 | 19440 | 31743 | 25567 | 1.63 | 40.2 | 8.5 | 24.6 | | | 0.92 |
| A2.0 | 9843 | 23039 | 23796 | 2.34 | | | | | | |
| A2.1 | 6493 | 16933 | 16116 | 2.61 | 62.6 | 6.2 | 10.6 | 1.45 | 1.94 | 0.75 |
| A3.0 | 5714 | 14920 | 15144 | 2.61 | 56.7 | 6.4 | 10.0 | 0.58 | | |
| A4.0 | 6034 | 10404 | 9701 | 1.72 | | | | | | 0.71 |
| A5.0 | 4321 | 6676 | 6145 | 1.55 | | | | | | 0.71 |
| A6.0 | 43609 | 66279 | 64782 | 1.52 | | | | | | |
| A7.0 | 18598 | 38802 | 40358 | 2.09 | | | | | | |
| A8.0 | 16596 | 31026 | 27402 | 2.35 | 44.7 | 8.7 | 15.7 | | | 0.71 |
| A9.0 | 11365 | 22902 | 18933 | 2.01 | | | | | | 0.71 |

The silicon(tenside) polyurethanes show typical molecular mass distributions with Mn: 5-18 kDa; Mw 14-36 and a poly dispersity of 1.9-2.9.

Example 2

Membranes

The following procedure is carried out in the preparation of membranes:

Place N-methylpyrolidone (NMP) (70 ml) in a three-neck flask with agitator. Add polyvinylpyrolidone Luvitec® PVP 40 K (6 g) to the NMP and increase the temperature to 60° C. and stir until a homogeneous clear solution is obtained. Mix required amount of the polyurethane of the invention (additive of example 1; 5 w % in respect to polyethersulfone, 0.9 g) to 6 g of NMP and sonicate for 20 minutes and add the solution to the PVP solution and stir until the solution is homogeneous. Add polyethersulfone Ultrason® 2020 PSR (PES, 18 g) to the solution and stir until a viscous solution is obtained. Degas the solution overnight at room temperature (30-40° C.). Reheat the membrane solution to 70° C. Cast membrane on the glass with a casting knife (200 μm) at room temperature and allow dry time of 30 second before immersion. Cast membrane in water bath of 25° C. After 10 minutes of immersion, rinse membrane with hot water (65-75° C., 30 minutes). Membrane preparation should form a continuous film having micro structural characteristics of UF membranes; a continuous film (at least 10×15 cm size) with a top thin skin layer (1-2 microns) and a porous layer underneath (thickness: 100-150 microns) is obtained characterized by: Void breadth on top: 2.0 µm; skin layer: 1.2 µm; thickness: 120 µm; pore size under skin layer: 1-3 µm.

Physical-Chemical Performance of the Membrane:

Analysis of silicone-polyurethane additives in the surface of the membrane is carried out using a variety of surface characterizing techniques. Scanning electron microscope/energy dispersive X-ray spectroscopy (SEM/EDX) to visualize the morphology and get a qualitative information of Silicon distribution and therefore additive distribution on the surface, X-ray photoelectron spectroscopy (XPS) to get quantitative information of the silicon content in the surface (1-4 monolayers=2-10 nm). This information allows the determination of an enrichment factor of the polymeric additive in the surface of the membrane) and matrix-assisted laser desorption ionization as a mass spectrometry (MALDI-MS) imaging technique in which the sample, often a thin tissue section, is moved in two dimensions while the mass spectrum is recorded. Here qualitative information on the nature of the additive (dimethylsiloxane- and polyethylenglycol-fragments) and their distribution on the surface are available. Topographical microdomains of additive bylateral phase separation in the coverage might be observed thereby in a resolution of 420×420 $nm^2$.

Characterization of Membranes by SEM/EDX and XPS:

The membranes are characterized by XPS (X-Ray Photoelectron spectroscopy). The obtained concentration of silicon atoms in the 2-10 nm deepness of the surface indicates a high enrichment based over the theoretical silicon in bulk material at 5 w % initial additive loading to polyethersulfone (enrichment factor EF=w % Si at surface/w % Si calculated).

Results are compiled in the following table 3; Si concentrations [Si] are given in % by weight, as sampled over 3 points of 0.5 $mm^2$ each, in bulk (calculated) or at surface (2-10 nm).

TABLE 3

Membrane characteristics

| Membrane | Additive [w %] | [Si] calculated | [Si] surface | EF |
|---|---|---|---|---|
| M1 | A1.0 [5] | 1.2 | 11.8 | 9.6 |
| M2 | A8.0 [5] | 0.8 | 9.8 | 12.5 |
| M3 | A2.1 [5] | 0.5 | 7.1 | 13.5 |
| M4 | A3.0 [5] | 0.5 | 8.9 | 17.8 |
| M6 | A1.0 [5] | | | |
| M7 | A1.0 [10] | | | |
| M8 | A2.0 [5] | | | |
| M9 | A2.0 [10] | | | |
| M10 | A4.0 [5] | | | |
| M11 | A5.0 [5] | | | |
| M12 | none | 0 | | |

The XPS measurements indicate the polymeric additives enrichments on the surface of membranes (2-10 nm deepness) depending on the type of additive with a factor of 10-18 (calculated from an average of 5 w % additives in respect to PES).

A SEM/EDX analysis is carried out for the membrane M1 containing the additive A1.0 at the surface. The even distribution of the additive is also recognized in resolution of 420×420 $nm^2$ of an area 100×100 µm by MALDI-ToF SIMS, mapping silicon of membrane surface M1. The characteristic fragments for silicon and PEG (mass fragment m/z 45) are observed. The Si/PEG-ratio suggests a homogenous distribution of the additive on the surface.

Characterization of Membranes by Water Contact Angle and Water Flux:

Water flux is performed in a dead-end filtration cell (110 ml capacity, membrane area 1.59×$10^{-3}$ $m^2$) connected to a feed reservoir with a nitrogen cylinder as a pressure source. The filtration cell consists of a cylindrical vessel, equipped with a porous support on which membrane is placed. A stirrer is installed in the cell and a speed of 400 rpm is maintained during the test. Experiments are operated at constant pressure (100 kPa) and permeate is collected in a beaker placed on an electronic balance. A pressure transducer is connected to the upstream side of membrane to measure the pressure in the cell. Both balance and pressure transducers are connected to a computer for data recording. Membranes are moisted with ethanol before flux measurement. Results for membranes M6 to M11 and M12 (comparison) are average values obtained from 5 measurements [WCA] or 3 measurements [water flux]. Membranes of the invention show a high water contact angle of more than 68° and a good water flux.

Example 3

Anti-Adhesion Performance

Two tests are applied to assess anti-adhesion properties of the membrane's surfaces.

a) Protein adhesion; the recovery of flux the membranes of the invention is determined in relation to a membrane without additive: Surfaces are contacted with BSA (bovine serum albumine) as a model protein. BSA adhesion reduces the water flux; the flux can be recovered by rinsing with water (Jw) or by additional chemical treatment (Jc) with sodium hydroxide. Flux recovery (normalized to the initial water flux) indicates the membrane's ability to self-cleaning and reduction of fouling.

Instruments: X-flow membrane cell, UV-vis spectrometer

Procedure:

Water flux and BSA filtration are performed using a non-commercial experimental prototype Perspex crossflow module of channel dimensions of 3 mm high, 25 mm width and 110 mm length. A feed pressure of 100 kPa is obtained using a peristaltic feed pump (Master flux Model 7529-00 by Cole Parmer) and adjusted by a ball valve situated at the module outlet. With the channel dimension given, a cross flow velocity of 0.2 m/s is maintained for all experiments. A pressure transducer (Labom Diff. Pressure transmitter CP1310) connected to both feed and permeate sides of the membrane is used to measure the TMP (trans membrane pressure); a balance is used to monitor the permeate flux.

The experiment consists of four main stages: initial water flux, fouling, water rinse and chemical cleaning. This sequence is repeated 3 times for each membrane.

In a typical run, a membrane strip of appropriate dimension is cut out from a flat sheet and mounted in the cross flow cell; polypropylene backing is used as support. The membrane is pre-compacted at 125 kPa until a constant flux is obtained. Then the pressure is reduced to 100 kPa and the initial water flux (Ji) is measured (for about 1 hour). Then the ultrafiltration experiments are performed with 0.5 wt % BSA (pH is adjusted to 4.9-5.1 by drop-wise addition of 0.1 M HCl) solution at constant pressure of 50 kPa and constant flux of about 41±3 L/$m^2$h for 90 minutes. Constant flux is achieved by using a Gilson pump in the permeate line. Then the membrane is rinsed with water for 15 minutes (1 L/min) and pure water flux is measured (Jw1). Chemical cleaning is done by rinsing membrane with a 0.2 wt % NaOH solution for 15 minutes and after buffering the cell, water flux is measured again (Jc1). The cycle is repeated 3 times. Flux recovery and resistance removal for different membranes are estimated. Samples from permeate are withdrawn for analysis by UV spectrometer to estimate the rejection. Membranes samples of the invention are taken from permeate/retentate to examine the release of the active component.

The following table 4 shows the flux of membranes of the invention relative to the flux observed with a membrane (M12) containing no copolymer of the invention (recovery after 3 cycles).

TABLE 4

Flux recovery after 3 cycles using water rinsing and addl. chem. cleaning (Jc)

| Membrane | Additive (% to PSU) | Jc |
|---|---|---|
| M6 | A1.0 (5) | 1.64 |
| M7 | A1.0 (10) | 1.05 |
| M8 | A2.0 (5) | 1.34 |
| M9 | A2.0 (10) | 1.49 |
| M10 | A4.0 (5) | 1.07 |
| M11 | A5.0 (5) | 1.32 |

The present membranes show good flux recovery.

b) Anti-adhesion of bacteria: Relative adhesion effects are quantified using antibody-antigen reactions to monitor bacteria adhered to the surface. Testing of *Escherichia coli* and *Staphylococcus aureus* is conducted according to DIN EN ISO/IEC 17025.

The samples are incubated with test cell system. Loose cell material is removed in defined washing steps. Adhered cells on the sample surface are detected in an immune assay using antigen-antibody reactions. The adhesion is monitored by a relative semi-quantitative cell unit counting. Thereby a first-anti-body reaction occurs on the adhered test cell system; docking on this first level antibody, a specific enzyme is fixed by a secondary antibody. After addition of a colouring substrate, an enzyme catalysed colouring reaction occurs; coloration is proportional to the amount of adhered cells. Compared to the blank (membrane without polyurethane additive) the relative adhesion is evaluated. Each sample is independently measured nine times. The test result for the sample is normalized to the blank (comparative) sample's average.

The relative adhesion results as quotient of the average data of the samples and the comparative blank sample. Multiplication by 100 results in relative adhesion in percentage unit. Samples with a relative adhesion >100% demonstrate increased adhesion of test bacteria. Materials with a relative adhesion of <100% demonstrate decreasing adhesion (adhesion reduction). Results are compiled in the below table 5.

TABLE 5

Adhesion of *E. coli* (Ec) or *S. aureus* (Sa) relative to comparative membrane

| Membrane | Additive | % adhesion Ec | % adhesion Sa |
|---|---|---|---|
| M1 | A1.0 | −14 | −40 |
| M2 | A8.0 | −42 | −8 |
| M3 | A2.1 | −44 | −3 |
| M4 | A3.0 | −45 | −22 |

Membranes of the Invention Effectively Inhibit Bacterial Adhesion.

Example 4

Copolymers Used in Flat Sheet Membranes

Siloxane block-urethane copolymers are prepared according to example 1. The ratio between the different diols and the type of isocyantes used are reported in the table below:

TABLE 6

Copolymer's composition

| Copolymer | IM22 (g) | IM15 (g) | PSU (g) | MDI 4,4' (g) | HDI (g) |
|---|---|---|---|---|---|
| B | 20 | / | 40 | / | 4.0 |
| C | 10 | / | 40 | / | 3.1 |
| D | 10 | / | 40 | 5.95 | / |
| E | 15 | / | 30 | 5.38 | / |

These copolymers have been characterized by GPC and elemental analysis:

TABLE 7

GPC (PS calibration) and elemental analysis of copolymers

| Copolymer | Mw (Da) | Mn (Da) | Mp (Da) | PD | Elemental analysis |
|---|---|---|---|---|---|
| B | 9033 | 3811 | 7286 | 2.37 | C: 63%; H: 6.58%; N: 1.37%; O: 16.8%; S: 3.54%; Si: 5.3% |
| C | 10161 | 3454 | 9112 | 2.94 | C: 66.3%; H: 5.64%; N: 1.38%; O: 15.6%; S: 4.15%; Si: 3.3% |
| D | 9527 | 3129 | 7470 | 3.04 | C: 68.6%; H: 6.50%; N: 1.41%; O 15.5%; S: 4.1%; Si: 2.8% |
| E | 18633 | 4467 | 13372 | 4.17 | C: 64.9%; H: 6.8; N: 1.48; O: 15.4%; S: 3.7%; Si: 4.3% |

These additives have been used at 5% b.w. to prepare flat sheet membranes according with the procedure described in example 2.

The membranes are characterized by XPS (X-Ray Photoelectron spectroscopy). A high enrichment based over the theoretical silicon in bulk material at 5 w % initial additive loading to polyethersulfone (enrichment factor EF=w % Si at surface/w % Si calculated).

Results are reported in the following table; Si concentrations [Si] are given in % by weight, as sampled over 3 points of 0.5 mm2 each, in bulk (calculated) or at surface (2-10 nm).

TABLE 8

Si concentration in flat sheet membranes bulk and on surface. Enrichment factor as ratio between Si on surface and in the bulk.

| Membrane | Copolymer | Si % in the bulk | Si % on surface | EF | XPS Elemental analysis |
|---|---|---|---|---|---|
| MA2 | B | 0.25% | 3.8% | 15.2 | C: 72.1%; S: 3.4% N: 2.0%; O: 18.7%; Si 3.8% |
| MA3 | C | 0.15% | 3.7% | 24.7 | C: 72.9%; S: 3.1% N: 2.2%; O: 18.0%; Si 3.7% |
| MA4 | D | 0.10% | 3.9% | 39 | C: 71.4%; S: 3.0% N: 2.6%; O: 19.4%; Si 3.9% |
| MA5 | E | 0.19% | 4.4% | 23.2 | C: 70.1%; S: 2.9% N: 2.4%; O: 20.1%; Si 4.4% |

XPS measurements show that the enrichments of polymeric additives on membrane surface is changing on the basis of the additive chemical composition and structure. In general additive with lower Si content exhibit a higher surface enrichment (EF).

Membranes are then characterised by contact angle, flux recovery after water or chemical cleaning and water flux. The procedure for water and chemical flux test is described on pag 13-14 (Case PF70441).

TABLE 9

Flux recovery after 3 cycles of water(JW) or chemical cleaning (JC). Contact Angle (°) and water flux.

|  | JW | JC | Water Flux (L/m²h) | Contact angle (°) |
|---|---|---|---|---|
| MA2 | 0.72 | 0.94 | 190 ± 40 | 92 ± 5 |
| MA3 | 0.62 | 0.85 | 220 ± 60 | 83 ± 4 |
| MA4 | 0.84 | 1.01 | 200 ± 40 | 84 ± 2 |
| MA5 | 0.63 | 0.85 | 180 ± 40 | 86 ± 2 |
| Control (PES) | 0.42 | 0.74 | 280 ± 30 | 61 ± 7 |

Membranes functionalized with siloxane block-urethane copolymers of the invention show better flux recovery after both water and chemical cleaning (compared with standard non flat sheet PES membrane).

Water flux is in the same range of standard PES membrane which means that these additives do not significantly impact membrane pore structure. Contact angle for functionalized membranes is higher if compared with standard PES (membrane surface is more hydrophobic), this is reflection these additives' behavior to self-enrich on membrane surface as can be detected by and higher amount of Si on surface if compared with the bulk.

The invention claimed is:

1. A polymer composition comprising
a) an oligourethane or polyurethane of formula I

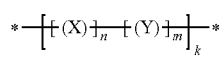
(I)

wherein k and n are each independently a number of from 1 to 100,
m is a number of from 1 to 100,
(X) is a block of formula (II),

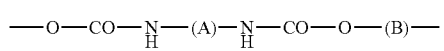
(II)

and
(Y) is a block of formula (III),

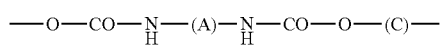
(III)

wherein
(A) is a residue of an aliphatic or aromatic diisocyanate linker,
(B) is a residue of a linear oligosiloxane or polysiloxane comprising alkanol end groups, and optionally further comprising an aliphatic ether moiety, and (C) is an aromatic oligosulfone or polysulfone block;
or a mixture of oligourethanes or polyurethanes thereof; and b) at least one further organic polymer selected from the group consisting of polyvinyl pyrolidone, polyvinyl acetates, cellulose acetates, polyacrylonitriles, polyamides, polyolefines, polyesters, polysulfones, polyethersulfones, polycarbonates, polyether ketones, sulfonated polyether ketones, polyamide sulfones, polyvinylidene fluorides, polyvinylchlorides, polystyrenes, and polytetrafluorethylenes, copolymers thereof, and mixtures thereof.

2. The polymer composition according to claim 1, wherein a molecular weight (Mn) of the compound of formula I is from 1500 to 100000, n and m are each from 1 to 50, and k is from 1 to 20.

3. The polymer composition according to claim 1, wherein the oligourethane or polyurethane of formula I
A) is a divalent residue selected from the group consisting of $C_2$-$C_{12}$alkylene and Ar;
(B) is a divalent residue of an oligosiloxane or polysiloxane of formula (IV),

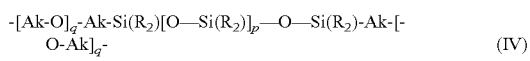
(IV)

wherein Ak is $C_2$-$C_4$alkylene, $R_2$ is $C_1$-$C.4$alkyl, and p, q and q' are each independently a number from 0-50; and
(C) is a diphenyl sulfone monomer or linear oligomer or polymer block comprising 1-50 moieties phenyl-$SO_2$-phenyl, and optionally further 1-50 further moieties Ar, which moieties are, in case of the oligomer or polymer, linked together by spacers Sp;
Ar is -Ph-Sp-Ph-;
Ph is phenyl or phenyl substituted by $C_1C_4$alkyl; and
Sp independently is selected from the group consisting of direct bond, —O—, and $C_1$-$C_3$alkylene.

4. The polymer composition according to claim 1, comprising the oligourethane or polyurethane of formula I in an amount of 0.1 to 25% by weight of the total polymer composition.

5. The polymer composition according to claim 1, further comprising at least one antimicrobial or bacteriostatic agent selected from the group consisting of silver colloid, silver glass, silver zeolite, silver salts, and elemental silver in form of powder, microparticle, nanoparticle or cluster.

6. A membrane comprising the polymer composition of claim 1.

7. The membrane of claim 6, having an at least 8-fold enrichment of silicon in a section 2-10 nm from the membrane surface over an average silicon content of the membrane.

8. A process for the preparation of a membrane, the process comprising incorporating a polymer composition according to claim 1 into a membrane material.

9. An oligourethane or polyurethane compound of formula I

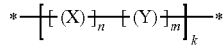
(I)

wherein k and n are each independently a number of from 1 to 100,
m is a number of from 1-100, (X) is a block of formula (II)

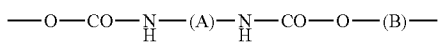
(II)

and (Y) is a block of formula (III)

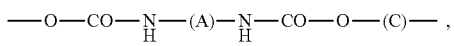
(III)

wherein
(A) is a residue of an aliphatic or aromatic diisocyanate linker,
(B) is a residue of a linear oligosiloxane or polysiloxane comprising alkanol end groups, and optionally further comprising an aliphatic ether moiety, and
(C) is an aromatic oligosulfone or polysulfone block.

10. The compound of formula I according to claim 9, wherein a molecular weight (Mn) of the compound is from 1500 to 100000, wherein n and m are from 1 to 50, and k is from 1 to 20.

11. The polymer composition according to claim 1, comprising b) at least one further organic polymer selected from the group consisting of polysulfones, polyethersulfones, polyvinylidene fluorides, polyamides, cellulose acetate and mixtures thereof.

12. The polymer composition according to claim 3, wherein a molecular weight (Mn) of the compound of formula I is from 1500 to 100000, n and m are each from 1 to 50, and k is from 1 to 20.

13. The polymer composition according to claim 12, comprising the oligourethane or polyurethane of formula I in an amount of 0.1 to 25% by weight of the total polymer composition.

14. The polymer composition according to claim 1, comprising the oligourethane or polyurethane of formula I in amount of 0.1 to 25% by weight of the total polymer composition in a homogeneous phase.

15. The polymer composition according to claim 1, comprising the oligourethane or polyurethane of formula I in an amount of 0.1 to 25% by weight of the total polymer composition within the same phase enriched at the surface.

16. The polymer composition according to claim 1, further comprising an antimicrobial or bacteriostatic agent.

17. The compound of formula I according to claim 9, wherein a molecular weight (Mn) of the compound is from 4000 to 25000, n and m are from 1 to 50, and k is from 1 to 20.

* * * * *